May 20, 1969   W. SIMON ET AL   3,445,363
GLASS-ELECTRODE

Filed Nov. 5, 1964   Sheet 1 of 3

INVENTORS:
Wilhelm Simon &
BY   Dorothée Wegmann

United States Patent Office 3,445,363
Patented May 20, 1969

3,445,363
GLASS-ELECTRODE
Wilhelm Simon and Dorothée Wegmann, Zurich, Switzerland, assignors to Gebrüder Möller Glasblaserei, Zurich, Switzerland
Filed Nov. 5, 1964, Ser. No. 409,082
Claims priority, application Switzerland, Nov. 13, 1963, 13,946/63
Int. Cl. B01k 3/06, 3/04
U.S. Cl. 204—195    12 Claims

ABSTRACT OF THE DISCLOSURE

A glass-electrode cell assembly comprising a given reference electrode and a glass-electrode, said glass-electrode incorporating an internal reference electrode and a buffer solution filling housed in said glass-electrode, wherein said buffer solution filling is selected so that there is achieved independently of the temperature of the assembly, a potential of the cell assembly of zero at a pH of 7 of the sample.

---

Figure 1:
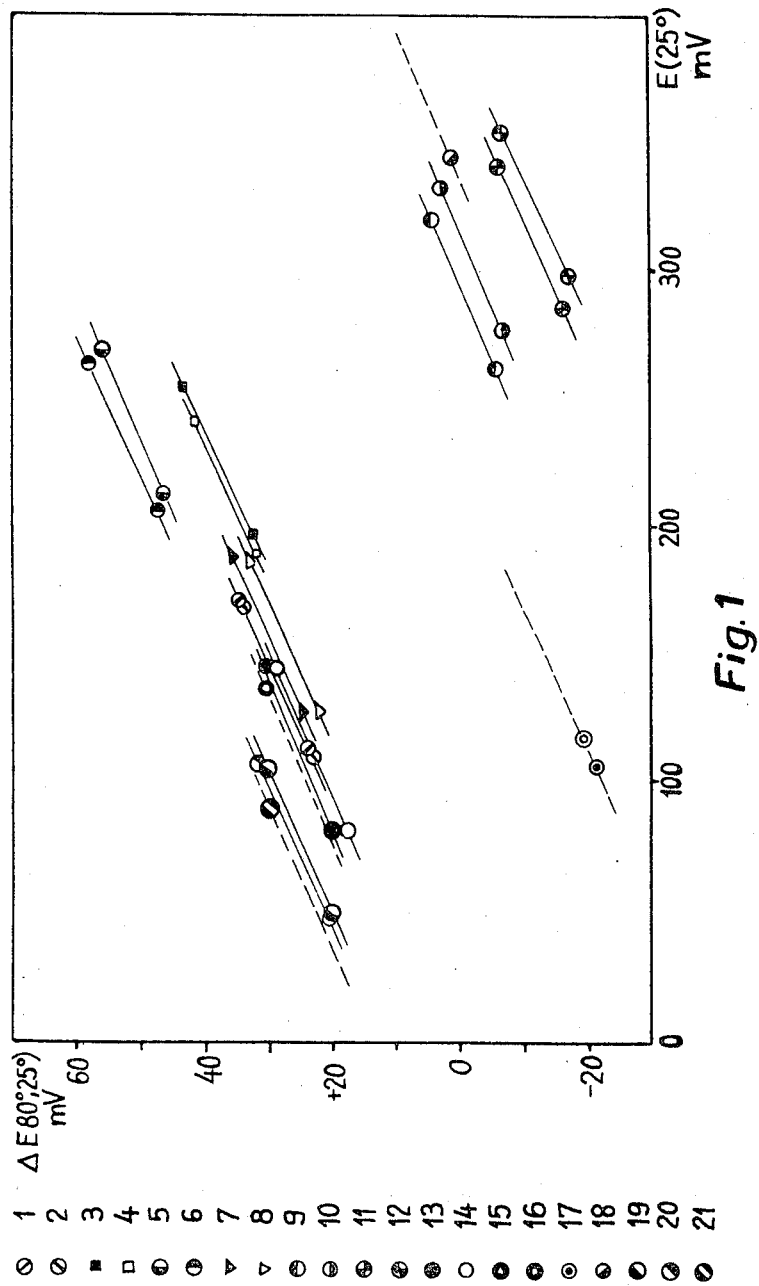

The present invention relates to the measurement of electric potential differences in aqueous and nonaqueous solutions for analytical purposes, for example for the determination of the concentration of specific ions, for instance hydrogen ions, alkali metal ions, etc., and, more particularly, to a glass electrode cell assembly or measuring chain which is particularly suited for pH-measurements, that is, for the determination of the hydrogen ion activity in a given solution.

In glass electrode cell assemblies or measuring chains for pH-measurement the Nernst-equation determines the functional dependence of the potential difference $E(T)$ from the temperature. Accordingly, a linear relationship exists between the electromotive force EMF $E(T)$ of the cell assembly and the pH-value of a sample to be measured. The linear curves (isotherms) for two different temperatures intersect, and the point of intersection is the so-called point of intersection of the isotherms.

A verry desirable special arrangement for measuring purposes would be a glass electrode cell assembly for which all isotherms intersect at the same point of intersection of the isotherms. Advantageously, this point of intersection should be situated at a pH-value of 7 of the sample and should, if possible, coincide with the electrical zero value of the cell assembly, i.e. $E(T)=O$.

In industry there is an increasing demand for glass electrode cell assemblies which would permit an exact, simple, and continuous measurement of the pH-value at various temperatures, even under conditions which in prior art pH-measurement techniques were considered extreme, for example at temperatures of above 100° C. and below 0° C. At this point it is mentioned that all temperatures referred to herein are given in degrees centigrade (°C.).

Various glass electrode cell assemblies have been proposed, for instance those operating with thallium amalgam/thallium chloride electrodes, but no fully satisfactory operation has been achieved with these prior art arrangements. For example, the electric zero point of such prior art arrangement, in effect, could not be set at pH=7 without considerably decreasing the buffer capacity of the inner solution. Setting of zero at a pH of 7, however, with a satisfactory degree of constancy is highly desirable for industrial and laboratory purposes.

Therefore, glass electrode cell assemblies should be arranged such that the temperature dependence of the zero point $(E(T)=O)$ should be minimized or eliminated. With such a glass electrode cell assembly the intersection of the isotherms in an ideal case would be sharp and situated at a pH of 7 of the sample.

Accordingly, it is a primary object of the present invention to provide an improved glass electrode cell assembly capable of achieving the aforestated desired conditions, singly or in combination.

It is another more specific object of this invention to provide an improved glass electrode cell assembly for which the isotherms intersect at a common and well defined point.

Furthermore, it is an object of this invention to provide an improved glass electrode cell assembly for which the isotherms intersect in a single point which at a pH value of 7 of the sample coincides with the electric zero level of the cell.

Another object of the instant invention is directed to an improved arrangement permitting simple, continuous, and dependable pH-measurements for industrial and laboratory purposes.

Figure 2:
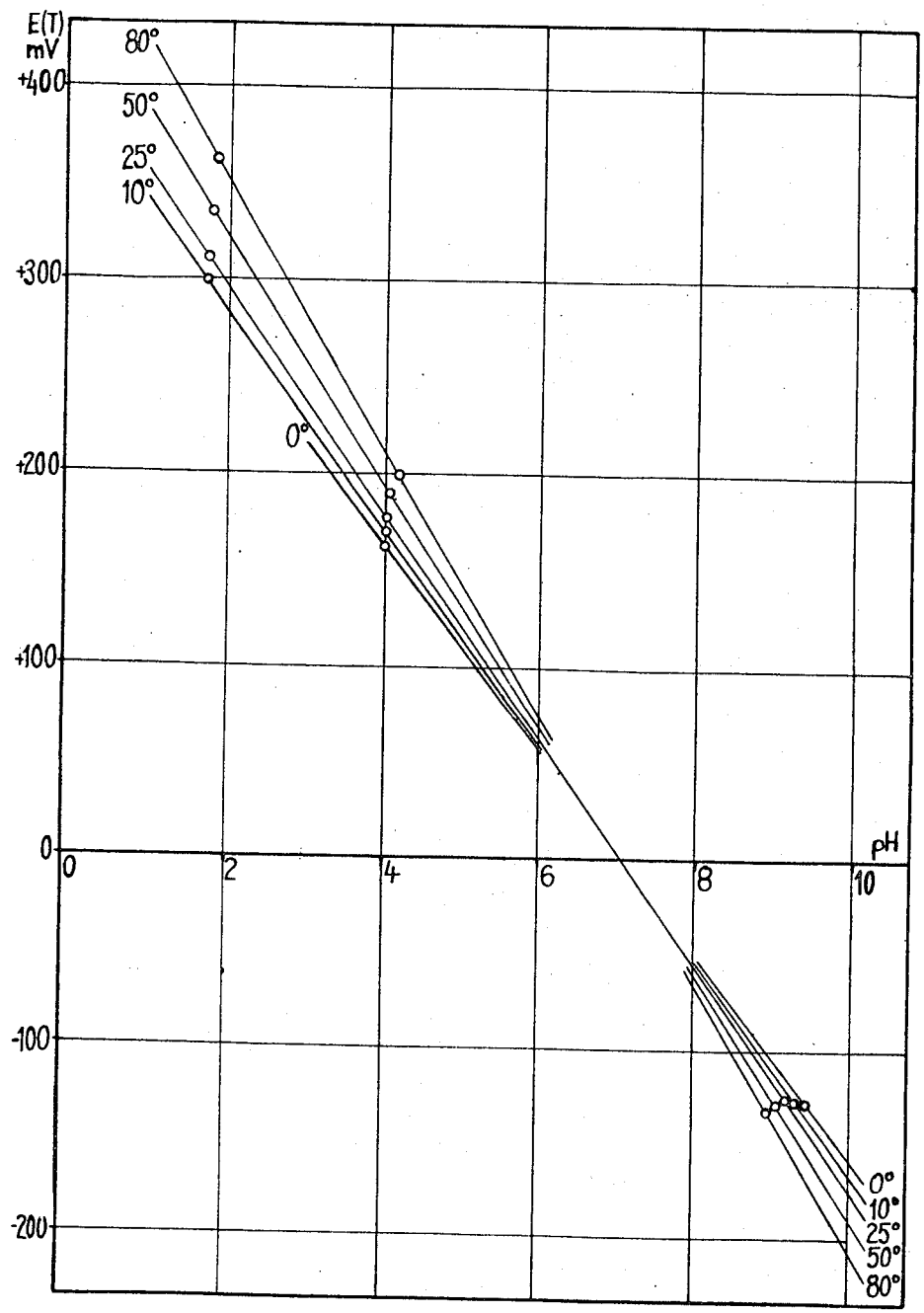
Figure 3:
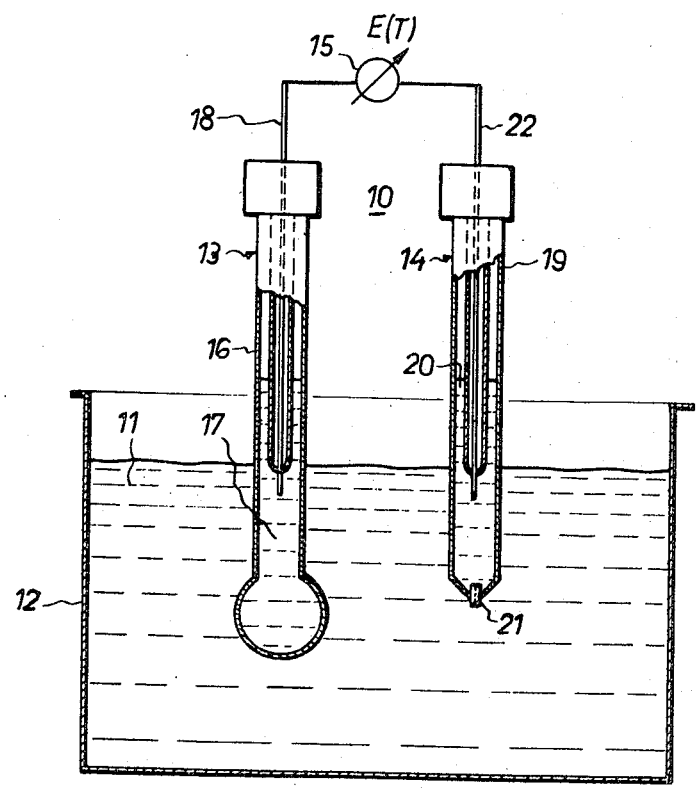

Other features, objects and advantages of the present invention will become apparent by reference to the following detailed description and drawings in which:

FIGURE 1 is a graph depicting the temperature dependence of the EMF of the cell assembly as a function of the EMF at 25° C. of the cell;

FIGURE 2 graphically depicts the behaviour of the glass electrode cell assembly at different temperatures; and FIGURE 3 diagrammatically depicts the arrangement of the glass electrode cell assembly according to the invention.

More precisely, and according to a first aspect of the present invention it has been found that the herein stated objects can best be achieved, and the requirements of practical use readily fulfilled, by the provision of a glass electrode cell assembly generally characterized by the features that with a given reference electrode the pH-value and the activity of the ion, which determines the potential of the internal reference electrode (in the following termed also "outflow electrode") in the filling of the glass electrode comprised of a buffer solution are such that the potential of the glass electrode cell assembly at a pH-value of the sample of 7 is zero independent of the temperature.

The phrase "independent of temperature" in this context is, of course, to be understood with certain limitations, insofar as, on the one hand, upper and lower operational temperature limits are given by the appearance of solidification and boiling of the filling, and, on the other hand, an exact intersection point of the isotherms in general cannot be guaranteed for the entire range covering a difference of about 50° C. to 80° C.

It has been found, for example, that it is possible to advantageously obtain the desired pH-value and the corresponding ion activity in the filling of the glass electrode by employing a solution which comprises the following components in a solvent:

(a) At least one mono- or polybasic acid,
(b) At least one mono- or polyacidic base,
(c) A system providing the ions which determine the potential of the internal reference electrode and, if desired, (d) At least one neutral salt.

In connection with the electrode coming under primary consideration incorporating a silver/silver halide or mercury/calomel (calomel=$Hg_2Cl_2$) internal reference electrode the component of item (c) includes a source of halogen ions with the exception of fluorine ions in the case of a silver/silver halide internal reference electrode or a source of chloride ions in the case of a mercury/calomel internal reference electrode. With Ag/AgCl internal reference electrodes, the component of item (d) should not comprise halide salts. In order to produce buffer solutions suitable as electrode fillings mono- or polybasic acids having a pK-value of from 4 to 8, determined in water at 25° C., are particularly suitable as component of item (a), and mono- or polyacidic bases having a pK-value of above 6, preferably above 7, determined in water at 25° C., are suitable as the component of item (b).

Suitable organic and inorganic acids according to the invention having pK-values of about 6–8 include for example: p-nitrophenol, diethylmalonic acid, phenylphosphonic acid, and phosphoric acid.

Organic bases with a pK of above 7 which may be used for production of the electrode filling include, for example, the following: morpholine, monoethanol amine, diethanol amine and triethanol amine.

Instead of using a single member of the group of compounds suitable as components of items (a) thru (d) mixtures or combinations of such substances may be used as well. The concentrations depend upon the conditions of the intended measurement and may extend up to the saturation concentration of the individual components. In general, it is preferred to operate at lower concentrations, A molarity of 5, as a rule, is not exceeded.

Suitable solvents or mixtures of solvents in addition to water and suitable, for example for extreme temperatures, are mixtures of water and polyvalent alcohols, such as ethylene glycol, propylene glycol and glycerol, the latter being preferred. In some instances, a purely organic solvent can be employed.

For operations with silver/silver halide electrodes it has been found to be advantageous to maintain the concentration of halogen ions low in order to increase the stability of the silver chloride layer, or to avoid its removal by dissolution, respectively. It has further been found that in an Ag/AgCl-outflow arrangement a 0.1 molar concentration of chloride ions should not be transgressed if continuous operation at elevated temperatures is desired.

Furthermore, it has been seen that the silver chloride layer generally is also dissolved, or at least removed from its support, by the action of alkaline solutions of primary and secondary amines. Such compositions, therefore, are less preferred for the electrode filling.

In order to determine the position of the intersection point of the isotherms it is sufficient, in principle, to ascertain in the cell assembly to be tested the EMF corresponding to a known pH-value at two temperatures. For this purpose, a 0.05 M solution of monopotassium phthalate in water at 25° C. and 80° C. (pH=4.01 and 4.16, respectively), may be used. Such a solution has been proposed as a standard buffer by the National Bureau of Standards (USA) and will hereinafter be referred to as "NBS-buffer." If the EMF measured at 25° C. with glass electrode cell assembly A $$\underbrace{Hg; Hg_2KCl\ sat./}_{25°\ C.}$$

$$\underbrace{KCl\ sat./NBS\ buffer//glass//\ electrode\ filling,\ AgCl;\ Ag}_{25\ resp.\ 80°\ C.}$$

is designated as E (25° C.), the corresponding EMF at 80° C. is designated as E (80° C.), and the difference is designated ΔE(80° C., 25° C.) and equals $$E(80°\ C.) - E(25°\ C.)$$

the following relations result for the "NBS-buffer" provided that the glass electrode has the theoretical response K(T) of 59.156 mv./pH at 25° C., and of 70.068 mv./pH at 80° C.:

$$pH_{Iso} = \frac{\Delta E(80°\ C., 25°\ C.) + 53.99}{10.91} \quad (1)$$

$$E_{Iso} = E(25°\ C.) - 5.45 \cdot \Delta E(80°\ C., 25°\ C.) - 57.01 \quad (2)$$

$$pH_{Zero}\ (25°\ C.) = \frac{E(25°\ C.) + 237.23}{59.16} \quad (3)$$

In the above equations the terms "$pH_{Iso}$" and "$E_{Iso}$" denote the pH-value and the EMF (in millivolts) for the above described glass electrode cell assembly A at the intersection point of the isotherms and $pH_{Zero}$ the electrical zero point at 25° C. A glass electrode cell assembly immersed in the "NBS-buffer" having an intersection point of the isotherms at pH=7 with $E(T)=0$ millivolts (at pH=7) and sample temperatures of 25° C. and 80° C., respectively, should yield potential differences E(25° C.) of 176.9 and E(80° C.) of 199.0, respectively:

$$\Delta E(80°\ C., 25°\ C.) = E(80°\ C.) - E(25°\ C.)$$

theoretically should equal 22.1 millivolts.

The measurement results for the above cell A employing a series of solutions which in view of the desired high degree of constancy of the electrode potentials have a high buffer capacity and which are suitable as electrode fillings according to the invention are summarized in the following Tables I and II and in FIG. 1 of the drawings. FIG. 2 demonstrates the use of this cell at different temperatures.

TABLE 1.—FILLING OF GLASS-ELECTRODE

[Internal outflow system: silver/silver chloride-electrode]

| Electrode filling | | | | | | E(T) [mv.] of chain A in NBS buffer pH=4.01 25° C.* | ΔE(80° C., 25° C.) |
|---|---|---|---|---|---|---|---|
| Mol per liter | Acid | Mol per liter | Organic base | HCl Molarity | Weight, percent glycerol in H²O | | |
| 0.50 | Phenylphosphonic acid | 0.745 / 0.125 | Diethanol amine / Triethanol amine | 0.12 | 84 | +170 | +23 |
| 0.50 | do | 0.82 | Morpholine | 0.10 | 84 | +178 | +23 |
| 0.50 | do | 1.25 | Monoethanol amine | 0.50 | 84 | +133 | +23 |
| 0.50 | Phosphoric acid | 0.623 / 0.188 | Diethanol amine / Triethanol amine | 0.06 | 84 | +179 | +21 |
| 0.50 | do | 0.82 | Morpholine | 0.07 | 84 | +181 | +23 |
| 0.50 | do | 1.05 | Monoethanol amine | 0.30 | 84 | +130 | +23 |

*Standard deviation of a single measurement=0.9 millivolts.

TABLE II.—OUTFLOW SYSTEMS IN GLASS ELECTRODES FOR OPERATION AT ELEVATED TEMPERATURES

[Ag/AgCl internal reference electrode]

| Buffer (M) | Electrode filling NaCl (M) | Neutral salt (M) | Glycerol (vol. percent) | E(25° C.) (mv.) (A) | E(80° C. 25° C.) (mv.) (A) | No. in Fig. 1 |
|---|---|---|---|---|---|---|
| 1.0 succinic acid 1.5 NaOH | 0.1 0.01 0.1 0.01 | | 20 20 | +115.0 +172.2 +112.3 +168.7 | +24.0 +35.0 +23.5 +34.2 | 1a 1b 2a 2b |
| 0.5 KH$_2$PO$_4$ 0.5 Na$_2$HPO$_4$.2 H$_2$O | 0.1 0.01 0.1 0.01 | | 20 20 | +198.7 +257.4 +191.2 +244.3 | +32.2 +43.6 +32.1 +41.6 | 3a 3b 4a 4b |
| 1.0 phenylphosphonic acid 1.5 NaOH | 0.1 0.01 0.1 0.01 0.01 | 1.0 KNO$_3$ | 20 20 | +216.0 +272.2 +209.7 +165.8 +262.9 | +46.5 +56.1 +47.6 +57.9 +54.9 | 5a 5b 6a 6b |
| 1.0 citric acid 2.5 NaOH | 0.1 0.01 0.1 0.01 | 1.0 NH$_4$NO$_3$ 1.0 NH$_4$NO$_3$ | | +128.9 +191.6 +128.6 +188.0 | +24.4 +35.7 +22.2 +33.2 | 7a 7b 8a 8b |
| 1.0 N-methylmorpholine 0.5 acetic acid | 0.1 0.01 0.1 0.01 0.01 | 1.0 KNO$_3$ 1.0 KNO$_3$ | 20 | +262.2 +319.2 +276.1 +333.5 +314.3 | −6.5 +4.2 −7.4 +2.4 +0.5 | 9a 9b 10a 10b |
| 1.0 triethanol amine 0.5 acetic acid | 0.1 0.01 0.1 0.01 | 1.0 KNO$_3$ 1.0 KNO$_3$ | | +286.1 +341.8 +297.8 +353.1 | −16.0 −6.5 −16.9 −6.2 | 11a 11b 12a 12b |
| 1.0 acetic acid 0.5 NaOH | 0.1 0.0306 0.01 0.1 0.0306 0.01 0.01 | 1.0 NH$_4$NO$_3$ 1.0 NH$_4$NO$_3$ 1.0 NH$_4$NO$_3$ | 20 | +85.3 +113.8 +145.8 +84.3 +116.3 +146.7 +138.9 | +19.9 +25.6 +30.9 +17.4 +22.9 +29.2 +30.4 | 13a 13b 14a 14b 15 |
| 0.5 5-aminotetrazole 0.25 NaOH | 0.1 0.1 | 1.0 KNO$_3$ | | +117.9 +105.2 | −19.6 −21.9 | 16 17 |
| 1.0 succinimide 0.5 NaOH | 0.1 | | | +147.5 | +27.9 | |
| 0.5 3-hydroxypyridine 0.25 NaOH | 0.1 | | | +344.5 | +1.0 | 18 |
| Standard deviation of a single measurement. | | | | 1.0 | 1.3 | |

The E(25° C.) coordinate or axis (cf. FIG. 1) of an electrode filling which, for example, has a predetermined chloride ion activity is determined substantially by its pH-value and, therefore, the pK-value of the functional group responsible for the buffering action. Consequently, E(25° C.) is shifted by a one unit change of the pH-value for about 60 millivolts.

The temperature dependence of the dissociation constants (or the corresponding pK-values, respectively, i.e. negative logarithm of the dissociation constant) predominantly determines the ΔE(80° C., 25° C.) coordinate. For a quantitative prediction an exact knowledge of the temperature dependence of the dissociation constant is required. Changes in the ion strength by addition of a neutral salt, as well as changes in the composition of the solvent, e.g. the addition of glycerol, correspondingly influence the E(25° C.) and the ΔE(80° C., 25° C.) (cf. Tables I and II).

Since the E(25° C.) and the ΔE(80° C., 25° C.) of a measuring chain are to be set equal to the differences of the corresponding factors of the glass-electrode and the reference electrode, it is possible to select a filling for a suitable glass-electrode from a graph analogous to FIG. 1, if the E(25° C.) and the ΔE(80° C., 25° C.) for the reference electrode are known. The resulting measuring chain provides the desired position of the intersection point of the isotherms and the position of the zero level of the chain. In order that a mesuring chain comprising a reference electrode and a glass-electrode fulfills the above defined condition with respect to the position of the point of intersection of the isotherms $$(pH_{Iso} = pH_{Zero} = 7.0)$$

its E(25° C.) must equal 176.9 millivolts and its $$\Delta E(80°C., 25° C.)$$

must equal 22.1 millivolts.

On the basis of the Tables I and II numerous additional fillings may easily be selected, which if used in a chain with the outflow-electrode and the reference electrode on the Ag/AgCl-basis yield the requested $$\Delta E(80° C., 25° C.)$$

value of 22.1 millivolts if the reference electrode is at measuring temperature.

In FIGURE 2 the EMF-values determined in a measuring chain including the filling: 0.50 M phenylphosphonic acid, 0.745 M diethanol amine and 0.125 M triethanol amine, 0.12 M HCl and 84% by weight of glycerol in water, and having an Ag/AgCl-outflow, and a calomel-reference electrode in a NBS-buffer at temperatures of 0° C., 10° C., 25° C., 50° C. and 80° C. (the cartridge of the reference electrode being at 25° C–28° C.) are compared with the corresponding calculated isotherms. Calculation of the isotherms is based upon the assumption that the measuring chain has the theoretical slope or steepness (54.196 mv. at 0° C.; 56.180 mv. at 10° C.; 59.156 mv. at 25° C.; 64.116 mv. at 50° C.; 70.068 mv. at 80° C.) and that the point of intersection of the isotherms lies at a pH of 7.0.

For a silver/silver chloride-reference electrode operating in a saturated potassium chloride solution E(25° C.) amounts to −44 mv., and ΔE(80° C., 25° C.) is +3 mv. (in relation to a calomel-electrode saturated with KCl). This leads to the following values for the glass-electrode of the chain Ag; AgCl, KCl saturated/sample//glass//electrode filling, AgCl; Ag:

$E(25° C.) = +176.9$ mv. $+ (-44$ mv.$) =$
$\qquad$ 132.9 millivolts (mv.)
$\Delta E(80° C., 25° C.) = 22.1$ mv. $+3$ mv. $=$
$\qquad$ 25.1 millivolts (mv.)

By referring to FIGURE 1 it is easily deducible that an aqueous solution containing 1 M or 60.05 grams per liter of acetic acid (i.e. a 1 molar acetic acid concentration), 20.0 grams per liter of 0.5 M sodium hydroxide, 96.0 grams per liter of 1.2 M ammonium nitrate and 1 gram per liter of 0.0171 M sodium chloride constitutes an electrode filling which closely corresponds to the desired operative values.

Three glass-electrodes filled with this buffer solution and provided with silver wire, which was chlorinated on its surface, were stored during a period of one month at 140° C. in a concentrated solution of magnesium chloride in water. After this period the outflow system, i.e. the chlorinated silver wire, did not show any signs of corrosion and no visible removal of the silver chloride coating.

The thermal stability of the electrode filling was tested by storing the buffer saturated with silver chloride in a sealed pressure tube at 150° C. for a period of 24 hours, thereafter introducing the buffer after cooling in a glass electrode and measuring the E(25° C.)—value and the ΔE(80° C., 25° C.)—value. It was found that any variations of these values due to the pressure-temperature treatment were well within the margin of error of the measuring method, i.e. remained practically unchanged.

A further embodiment of the invention resulted from these observations which relates to the reference electrode and the measuring electrode, respectively. According to this aspect of the present invention, such electrodes of the type suitable for continuous operation at elevated temperatures are characterized by having a silver/silver halide-outflow and having in the electrolyte a maximum halogen ion concentration of 0.1 M.

In the following Table III the values of E(25° C.) and ΔE(80° C., 25° C.) are summarized for a series of electrolytes in the chain:

$$\frac{\text{Hg;Hg}_2\text{Cl}_2, \text{ KCl saturated/KCl saturated/NBS-buffer/}}{25° \text{C.}} \frac{\text{electrolyte, AgCl;Ag}}{25° \text{C. resp. 80° C.}}$$

TABLE III.—SILVER/SILVER CHLORIDE REFERENCE ELECTRODES FOR USE AT HIGH TEMPERATURES

| Electrolyte | ΔE(80° C., 25° C.) [mv.] | E(25° C.) [mv.] | No. in Fig. 1 |
| --- | --- | --- | --- |
| 0.1 M KCl; 1 M NH₄NO₃ | 20.1 | 51.0 | 19a |
| 0.01 M KCl; 1 M NH₄NO₃ | 30.1 | 106.3 | 19b |
| 0.1 M KCl; 2 M NH₄NO₃ | 20.2 | 48.1 | 20a |
| 0.01 M KCl; 2 M NH₄NO₃ | 31.1 | 108.8 | 20b |
| 0.01 M KCl; 1 M NH₄NO₃, 60 vol. percent glycerol | 29.7 | 91.7 | 21 |

From this data it is easily possible to also derive data for glass-electrode fillings for measuring chains according to the invention.

In FIGURE 3 there is diagrammatically depicted an arrangement for the glass-electrode measuring chain 10 capable of analysing a sample 11 housed in a container 12, for instance in order to determine the pH of this sample. It will be appreciated that the glass-electrode measuring chain 10 comprises a glass-electrode 13 and a reference electrode 14 between which there is electrically coupled a measuring instrument, in this case a voltmeter 15 for instance. The glass-electrode 13 embodies a special glass-housing 16 in which there is contained an electrolyte, i.e. buffer solution 17 constituting the glass-electrode filling and possessing the properties explained heretofore. Furthermore, this glass-electrode 13 includes an outflow electrode 18 which extends into the buffer solution 17 and is electrically coupled with the voltmeter 15.

The reference electrode 14 comprises a glass housing 19 containing a suitable electrolyte 20, with the lower end of this glass housing 19 carrying a diaphragm or membrane 21 immersed in the sample 11. This reference electrode also includes an outflow electrode 22 which extends into the electrolyte 20 and is electrically coupled with the voltmeter 15. It will be appreciated that the arrangement just described provides a glass-electrode measuring chain 10, which when the conditions for the various components thereof are complied with as already explained herein, is readily capable of achieving the objects set forth at the outset.

The foregoing detailed description has been given for clearness of understanding only, and no unnecessary limitations should be understood therefrom, as modifications will be obvious to those skilled in the art.

What is claimed is:

1. Glass-electrode cell assembly especially suited for pH-measurements comprising a given reference electrode and a glass-electrode, said glass-electrode incorporating an internal reference electrode and a buffer solution filling housed in said glass-electrode, said buffer solution filling being a solution which comprises a solvent and
    (a) at least one mono- or polybasic acid,
    (b) at least one mono- or polyacidic base, and
    (c) at least one kind of ions which determines the potential of said internal reference electrode, in which solution the concentrations of (a) and (b) as well as the activity of the ion which determines the potential of the internal reference electrode are selected to result, independently of the temperature of the assembly, in a potential of the cell assembly of zero at a pH of 7 of the sample.

2. Glass-electrode cell assembly, according to claim 1 wherein the ion which determines the potential of the internal reference electrode is a halide ion, with exception of fluorine ions.

3. Glass-electrode cell assembly according to claim 2, wherein said buffer solution filling of the glass-electrode comprises a solution of the following components in a solvent:
    (a) a mono- or polybasic acid having a pK-value of 4 to 8, measured in water at 25° C.,
    (b) a mono- or polyacidic base having a pK-value exceeding 6, measured in water at 25° C.
    (c) a source of halogen ions with the exception of fluorine ions.

4. Glass-electrode cell assembly according to claim 3, wherein said buffer solution filling additionally contains a neutral salt with the exception of halogen salts.

5. Glass-electrode cell assembly according to claim 3 wherein the base of item (b) possesses a pK-value greater than 7.

6. Glass-electrode cell assembly according to claim 1 wherein said buffer solution filling additionally contains a neutral salt.

7. Glass-electrode cell assembly according to claim 1, wherein the mono- or polybasic acid of the buffer solution filling is selected from the group consisting of phosphoric acids, hydrogen phosphates, dihydrogen phosphates, phenylphosphonic acid, carboxylic acids, p-nitrophenols, diethylmalonic acids, and succinimide.

8. Glass-electrode cell assembly according to claim 22 wherein the carboxylic acid is selected from the group consisting of acetic acid, succinic acid and citric acid.

9. Glass-electrode cell assembly according to claim 1 wherein the mono- or polyacidic base of the buffer solution filling is sodium hydroxide.

10. Glass-electrode cell assembly according to claim 16 wherein the buffer solution filling comprises an organic solvent.

11. Glass-electrode cell assembly according to claim 10, wherein said organic solvent is a polyhydric alcohol.

12. Glass-electrode cell assembly according to claim 1 wherein the mono- or polyacidic base of the buffer solution filling is selected from the group consisting of morpholine, monoethanol amine, diethanol amine and triethanol amine.

References Cited

UNITED STATES PATENTS

| 2,256,733 | 9/1941 | Cary et al. | 204—195.1 |
| 3,077,446 | 2/1963 | Van Den Berg | 204—195 |

JOHN H. MACK, *Primary Examiner.*

T. TUNG, *Assistant Examiner.*